(12) United States Patent
Piehler

(10) Patent No.: US 9,599,814 B2
(45) Date of Patent: Mar. 21, 2017

(54) HEAD-UP DISPLAY AND OPTICAL PROJECTION SYSTEM FOR A HEAD-UP DISPLAY

(71) Applicant: Sypro Optics GmbH, Jena (DE)

(72) Inventor: Eberhard Piehler, Nerkewitz (DE)

(73) Assignee: SYPRO OPTICS GMBH, Jena (DE)

( * ) Notice: Subject to any disclaimer, the term of this patent is extended or adjusted under 35 U.S.C. 154(b) by 151 days.

(21) Appl. No.: 13/927,378

(22) Filed: Jun. 26, 2013

(65) Prior Publication Data

US 2013/0342905 A1 Dec. 26, 2013

(30) Foreign Application Priority Data

Jun. 26, 2012 (DE) .................. 10 2012 210 808

(51) Int. Cl.
  *G02B 27/28* (2006.01)
  *G02B 27/01* (2006.01)
  *G02B 5/30* (2006.01)

(52) U.S. Cl.
  CPC ........... *G02B 27/0101* (2013.01); *G02B 5/30* (2013.01); *G02B 2027/0118* (2013.01)

(58) Field of Classification Search
  CPC .... G02B 27/01; G02B 27/285; G02B 27/283; G02B 5/30; G02B 27/017; G02B 27/286; G02B 3/0062; G02B 5/3083; H04N 9/3167; H04N 9/317; G03B 33/12; G02F 1/133536; G02F 1/13362; G02F 2001/13355
  USPC ............................ 359/362, 364–366, 483.01, 359/485.01–485.07, 489.08, 618–619, 359/629–633
  See application file for complete search history.

(56) References Cited

U.S. PATENT DOCUMENTS

| 5,757,547 A | * | 5/1998 | Rodman | G02B 5/3025 359/259 |
| 5,986,809 A | * | 11/1999 | Itoh | G02B 27/283 348/E9.027 |
| 6,067,193 A | * | 5/2000 | Sekine | G02B 27/283 349/5 |
| 6,081,378 A | * | 6/2000 | Romano | G02B 5/3025 359/485.07 |
| 6,084,714 A | * | 7/2000 | Ushiyama | G02B 27/283 359/485.04 |
| 6,144,492 A | * | 11/2000 | Iwamura | G02B 27/1046 348/E5.141 |

(Continued)

FOREIGN PATENT DOCUMENTS

DE   1020100 02 956   9/2011

*Primary Examiner* — Bumsuk Won
*Assistant Examiner* — Balram Parbadia
(74) *Attorney, Agent, or Firm* — Volpe and Koenig, P.C.

(57) ABSTRACT

The optical projection system according to the invention for a display has an imaging display unit, which emits image information at least partly in the form of unpolarized light, and imaging optics, wherein the imaging optics are configured to present a virtual image of image information generated by the display unit in a display area, and wherein the imaging optics are further configured to split the light emitted by the display unit into two partial beam paths each having a different polarization, to rotate the polarization direction of at least one of the two partial beam paths and to subsequently superimpose the two partial beam paths and to present them as a virtual image display in the display area.

14 Claims, 8 Drawing Sheets

(56) References Cited

U.S. PATENT DOCUMENTS

| | | | | |
|---|---|---|---|---|
| 6,404,550 B1* | 6/2002 | Yajima | ................ | G02B 27/283 |
| | | | | 348/E5.141 |
| 6,513,953 B1* | 2/2003 | Itoh | .................... | G02B 3/0062 |
| | | | | 348/E9.027 |
| 6,540,380 B2* | 4/2003 | Wang | .................... | G02B 5/005 |
| | | | | 353/20 |
| 6,856,304 B1* | 2/2005 | Hirakata | ............. | H04N 9/3108 |
| | | | | 345/32 |
| 6,864,861 B2* | 3/2005 | Schehrer | ........... | G02B 27/0172 |
| | | | | 345/7 |
| 7,002,743 B2* | 2/2006 | Seo | ..................... | G02B 5/3066 |
| | | | | 353/20 |
| 7,995,275 B2* | 8/2011 | Maeda | ................ | G02B 27/285 |
| | | | | 359/485.01 |
| 8,657,448 B2* | 2/2014 | Kobayashi | ........... | G02B 5/3058 |
| | | | | 349/9 |
| 9,151,960 B2* | 10/2015 | Awanohara | .......... | G02B 27/285 |
| 2005/0248845 A1* | 11/2005 | Seo | .................... | G02B 5/3066 |
| | | | | 359/485.01 |
| 2008/0309885 A1* | 12/2008 | Ikeda | .................... | G03B 21/16 |
| | | | | 353/31 |
| 2011/0164221 A1* | 7/2011 | Tilleman et al. | ............... | 353/20 |
| 2012/0169591 A1* | 7/2012 | Moriya et al. | ................ | 345/156 |

\* cited by examiner

HEAD-UP DISPLAY AND OPTICAL PROJECTION SYSTEM FOR A HEAD-UP DISPLAY

BACKGROUND OF THE INVENTION

The present invention relates to an optical projection system for a display, in particular, an optical projection system for a head-up display with improved light efficiency.

There are a number of projection functions, wherein a virtual image is generated and is reflected to a viewer via an optically transparent surface, such as a windshield of a motor vehicle. Such displays are, for example, so-called head-up displays (HUD) or head-mounted displays.

A conventional head-up display is known, for example, from DE 10 2010 002 956 A1. Frequently, imagers (such as a DMD, so-called "dot matrix device"), which emit unpolarized light, are used for the above display types. Due to the geometry of these displays, the image information is often reflected via an optically transparent surface (windshield) at an angle, wherein substantially only one polarization direction is reflected (the so-called Brewster angle). The optically transparent surface is hence not very efficient in terms of its reflective properties. However, it is often not possible to provide the optically transparent surface (windshield) with a reflective coating.

In order to produce a sufficiently bright image for the viewer, the image information must be emitted by the imager with high intensity which, on one hand, increases the costs of the imager and, on the other hand, causes undesirable heat-up in the region of the imager.

It is therefore the object of the present invention to increase the luminous efficiency of displays that generate a virtual image and to project the virtual image to a viewer via an optically transparent surface.

SUMMARY OF THE INVENTION

The present invention relates to an optical projection system for a display, in particular, an optical projection system for a head-up display with improved luminous efficiency.

It is the object of the present invention to increase the luminous efficiency of displays that generate a virtual image and project this virtual image to a viewer via an optically transparent surface.

The optical projection system according to the invention for a display has an imaging display unit, which emits image information at least partly in the form of unpolarized light, and imaging optics, wherein the imaging optics are configured to present a virtual image of image information generated by the display unit in a display area, and wherein the imaging optics are further configured to split the light emitted by the display unit into two partial beam paths each having a different polarization, to rotate the polarization direction of at least one of the two partial beam paths and to subsequently superimpose the two partial beam paths and to present them as a virtual image display in the display area.

BRIEF DESCRIPTION OF THE DRAWINGS

Embodiments of the invention will become apparent from the drawings and the following description. In the drawings.

DETAILED DESCRIPTION OF THE PREFERRED EMBODIMENTS

Figure 1:
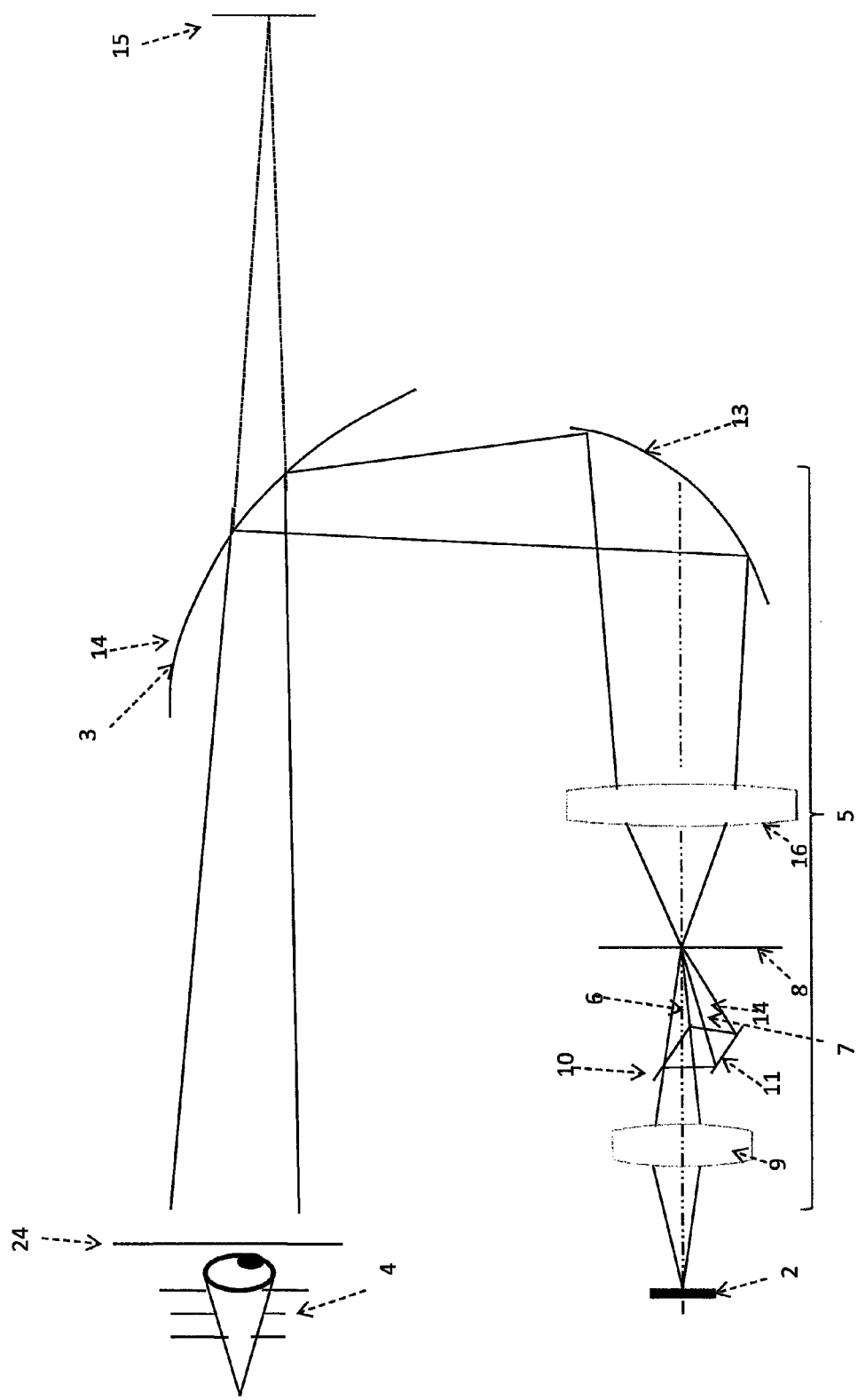
FIG. 1 shows an optical projection system for a head-up display in a schematic, sectional view according to a first preferred embodiment of the present invention.

According to one aspect of the present invention, an optical projection system for a display is disclosed, including: an imaging display device, which emits image information at least partly as unpolarized light, imaging optics which are configured to display a virtual image of image information coming from the display unit in a display area, wherein the imaging optics according to the invention are configured to split the light emitted from the display unit into at least two partial beam paths with different polarizations, to rotate the polarization direction of at least one of the two partial beam paths, to thereafter superimpose the two partial beam paths, and to generate a virtual image of the superimposed beam paths in the display area.

The present invention is based on the concept to modify the polarization of the light emitted from the imaging display unit radiation such that the polarization direction of the (subsequently superimposed) partial optical paths is oriented parallel to the transparent surface (windshield), i.e., perpendicular to the plane of incidence. This makes it possible to project to a viewer via the optically transparent surface (windshield) the light emitted from the imaging display unit with a high reflection coefficient (for all components of the emitted light, which is now oriented perpendicular to the plane of incidence, i.e., parallel to the transparent surface).

The optically transparent surface is preferably not mirror-coated, i.e., the reflection (of the visible light) of the optically transparent surface affects only a part of the luminous flux. The reflectance is dependent on the angle and is about 8% for uncoated glass surfaces (refractive index about 1.55) at normal incidence about 4.6% and at an angle of incidence of 57°. Generally, it is preferable to use optically transparent surfaces with a reflectance of visible light at an angle of 0° of preferably less than 10%, more preferably less than 5%.

The luminous efficiency of such systems can be significantly increased by modifying the polarization direction of a partial beam path, and can be doubled for light incident at the Brewster angle.

Preferably, the optical projection system according to the invention is used in a head-up display or a head-mounted display.

Preferably, the light is split into orthogonal polarization directions, whereafter one of the polarization directions is rotated by 90° and the information is then again combined (by increasing the etendue).

Since the etendue of the imaging display unit is unable to fill the required etendue for filling the eyebox of a viewer in a head-up display, no additional losses are encountered due to etendue considerations.

In a preferred embodiment of the invention, the imaging optics are configured so that the two partial beam paths, after having been split and after rotation of the polarization (of at least one partial beam path), are initially superimposed as a real intermediate image, with this real intermediate image then being displayed as a virtual image in the display area.

Depending on the embodiment of the invention, a screen or other means for scattering the light can be disposed at the position of the real intermediate image, but this is not required for practicing the invention. In particular, the means for scattering must be constructed such that the degree of polarization of the light is not affected at all or is not substantially deteriorated, because the reduction of the degree of polarization reduces the reflection efficiency on the combiner (windshield).

Alternatively, the two partial beam paths, after having been split and after rotation of the polarization (of at least one partial beam path), may be displayed directly as a virtual image in the display area, i.e., without prior superposition as an intermediate image.

Preferably, the imaging display unit emits at least partially unpolarized light. Preferably, the intensity of the unpolarized light emitted by the imaging display unit is preferably at least 30%, more preferably at least 50%, even more preferably at least 70% and still more preferably at least 90% of the total intensity. In a particularly preferred embodiment, the imaging display unit emits entirely unpolarized light. Preferably, the imaging display unit is formed by a DMD. The imaging display unit preferably also includes an optical projection system.

In a particularly preferred embodiment of the invention, the light emitted from the display unit is split into two partial beam paths directly at the output of the imaging display unit. The light emitted by the display unit is preferably spatially split into two partial beam paths by at least one polarizing beam splitter. Preferably, an additional element for deflecting (deflection mirror) of one of the partial beam paths is associated with the polarization beam splitter. The polarization direction of one of the two partial beam paths can preferably be rotated by a reflective surface inside the polarizing beam splitter. The polarization direction of one of the two partial beam paths may alternatively also be rotated by a separate optical element. In a particularly preferred embodiment, both the deflection of the partial beam paths as well as the rotation of the polarization direction of one of the two partial beam paths can be realized in an integrated element (the polarizing beam splitter).

As mentioned above, the polarization direction may be rotated by separate elements, such as a phase plate or a polarization rotator.

The polarization direction is rotated so that the polarization direction of the two optical paths is identical after their superposition, i.e., linearly polarized light is produced. The two partial beam paths are preferably superimposed in the intermediate image by a deflection unit. Depending on the arrangement of the partial beam paths, additional optical elements may preferably be provided for correcting the image size and for eliminating image artifacts. The image information coming from the display unit then corresponds to the intermediate image, wherein in contrast to the original image information, the intermediate image is preferably completely generated from polarized light.

According to another preferred embodiment of the invention, splitting into partial beam paths already occurs within the imaging display unit, which then has two output channels. In this case, the imaging optics of the optical projection system according to the invention is at least partly integrated in the imaging display unit.

Preferably, the imaging optics for generating a virtual image has at least one concave reflector. This concave reflector is preferably disposed between the (other) elements of the imaging optics and the optically transparent surface (windshield).

Preferably, a first focusing unit is arranged between the imaging display unit and the at least one polarization beam splitter.

In a particularly preferred embodiment of the invention, the light emitted from the display unit is split into two partial beam paths in the vicinity of the intermediate image plane. The light is focused by a lens array (preferably cylindrical lenses) having positive refractive power, and the polarization is recovered in this focused region. For this purpose, the lens array includes a plurality of focusing elements (preferably cylindrical lenses) arranged in a matrix pattern, wherein at least one polarization beam splitter is associated with each focusing element and a means for rotating the polarization direction is associated with each of the second polarizing beam splitter. The size of the array structure should be selected so that the resolution generated by the imager is maintained.

Another preferred embodiment uses elements which cause a polarization-dependent beam deflection. These may be, for example, birefringent crystals or diffractive structures. Due to the different beam deflection, different locations of the intermediate image can be generated in conjunction with a collecting element for the different polarizations. Linearly polarized light can thus be generated by rotating the polarization of one component.

Preferably, a second focusing is arranged between the at least one polarization beam splitter and the concave reflector.

According to another aspect of the present invention, a display with a transparent surface is disclosed, wherein the transparent surface operates in the viewing direction of a viewer as a display area, and wherein the display includes an optical projection system according to the invention with at least one of the preceding features.

The display is preferably a head-up display or a head-mounted display.

Preferably, the imaging optics are configured to rotate the polarization direction of at least one of the two partial beam paths so that the total light emitted by the display unit (after superposition of the two partial beam paths) has a polarization parallel to the transparent surface and perpendicular to the propagation direction of the light, respectively.

Preferably, the partial beam paths (of the intermediate image) superimposed by the imaging optics are incident on the optically transparent surface at an angle between 30° and 85°, preferably between 45° and 75° with respect to the normal vector of the optically transparent surface. More preferably, the partial beam paths (of the intermediate image) superimposed by the imaging optics are incident on the optically transparent surface at an angle of ±20°, preferably ±10° of the Brewster angle. The optically transparent surface (windshield) need not necessarily be planar, but may have some curvature. In this case, the angle of the normal vector of the optically transparent surface is considered, which is located at the geometric center of the area of the optically transparent surface contributing to the reflection.

FIG. 1 shows a head-up display with optical projection system 1 according to the present invention. The imager 2 generates two-dimensional image information which is presented to a viewer by the optical projection system 1 as a virtual image 4 in the focusing plane 15. The head-up display is preferably configured to show the image information of the imager 2 in different focusing planes. This can, for example, be realized with a concave reflector 13 having a variable focal length.

The image information of the imager 2 is reflected via an optically transparent surface 14 which acts as a display area 3. The optically transparent surface 14 may serve, for example, as the windshield of an automobile and must therefore not be mirror-coated. Therefore, the reflection coefficient does depend not only on the angle at which the image coming from the light sensor 2 is reflected, but more particularly on the polarization direction.

Since conventional imagers 2 frequently emit unpolarized light, and this light is often incident on the optically transparent surface 14 at an angle in the range of the Brewster angle, the light components having a polarization parallel to the plane of incidence experience no or almost no reflection. This effect disadvantageously reduces the luminous efficiency (the ratio of the intensity of the light reflected on the optically transparent surface 14 to the intensity of the light emitted by the imager 2).

This problem can be addressed according to the invention by guiding the unpolarized light emitted by the imager 2 through a converging lens 9 to a polarization beam splitter 10, which spatially splits the unpolarized light into a first partial beam path 6 with a first polarization (for example, perpendicular to the incident plane) and a second partial beam path 7 with a second polarization (for example, parallel to plane of incidence). The polarization beam splitter 10 in the present embodiment is designed such that the light having a polarization perpendicular to the plane of the paper is transmitted through the polarization beam splitter 10 without a change in direction, whereas the light having a polarization parallel to the plane of the paper is deflected toward the reflective surface 11 of the polarizing beam splitter 10. The polarization direction of the light deflected on the reflective surface 11 is rotated by the reflection such that the light of the second partial optical beam path 7 now also has the same polarization direction as the light of the first partial optical beam path 6, namely, perpendicular to the plane of the paper.

The spatially separated partial beam paths 6, 7 are imaged and superimposed by the reflective surface 11 on the intermediate image plane as a real intermediate image 8. Other advantageous implementations result from lens systems positioned only in the partial beam path 6 or the partial beam path 7. In the present embodiment, the intermediate image plane (the intermediate image 8) is planar; however, this is not a limitation of the present invention. The intermediate image plane 8 (the intermediate image 8) may also be formed, for example, by a curved surface.

Since the optical paths from the converging lens 9 to the intermediate image 8 via the different beam paths 6, 7 are different, the partial beam paths 6, 7 may be processed differently.

The intermediate image 8 is subsequently imaged with a beam-shaping element/second focusing unit 16 and the concave mirror 13 via the optically transparent surface 14 as a virtual image which appears in the focusing plane 15. The viewer 4 can now perceive the image information generated by the imager 2 as being located behind the transparent surface 14.

Since the light of the second partial beam path 7 has the same polarization direction as the light of the first partial beam path 6, namely perpendicular to the plane of incidence, the light incident at an angle a (preferably between 30° and 85°) is reflected at the transparent surface 14 with a comparatively higher reflection coefficient than unpolarized light, which increases the intensity perceived by the viewer.

Figure 2:
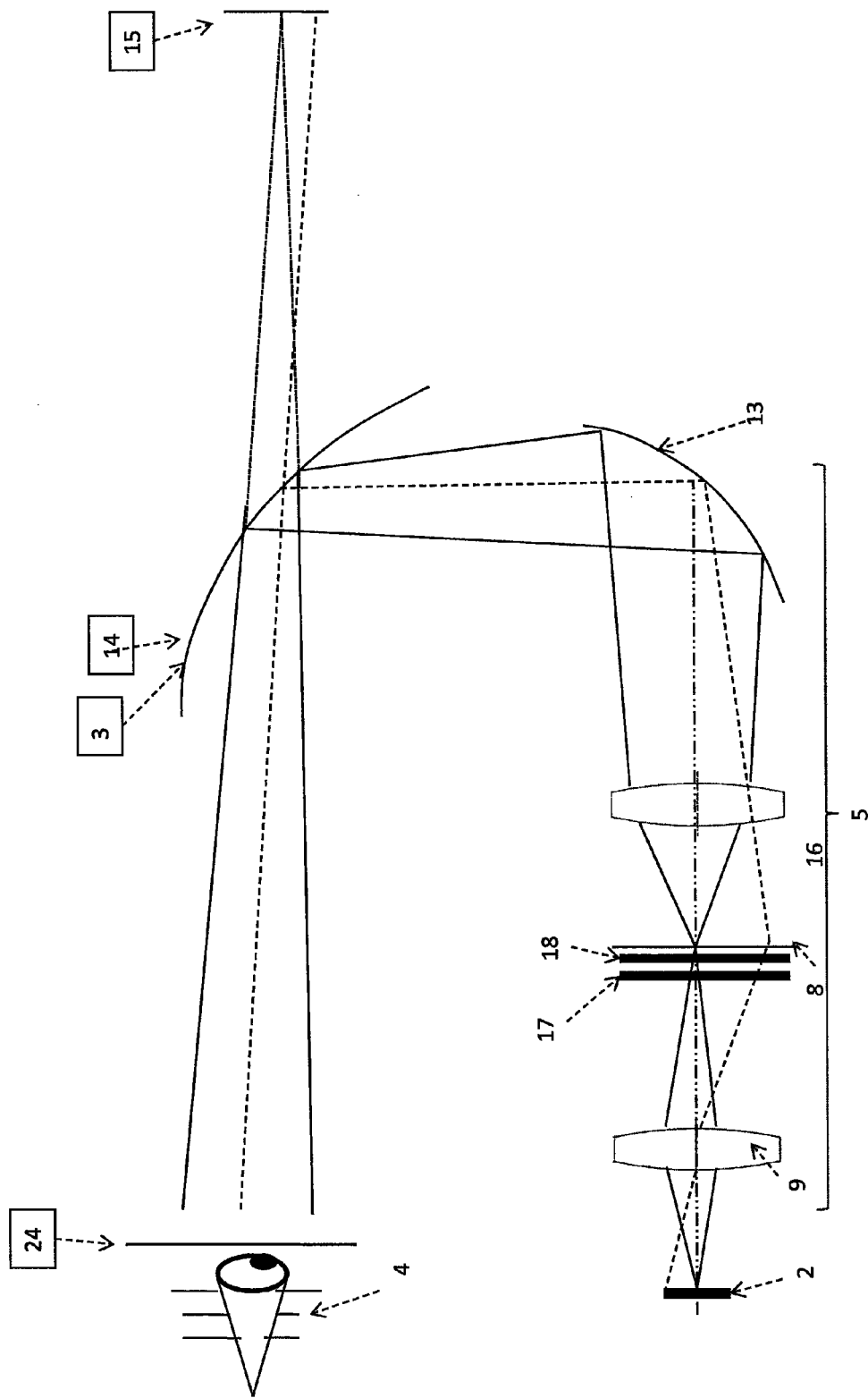
FIG. 2 shows an optical projection system for a head-up display in a schematic, sectional view according to a second preferred embodiment of the present invention.

FIG. 2 shows a head-up display with an optical projection system 1 according to the invention according to another preferred embodiment. Whereas in the embodiment according to FIG. 1, the light from the imager 2 is split into two partial beam paths 6, 7 in the vicinity of the imager 2 and these partial beam paths are subsequently imaged to the intermediate image 8; the light from the imager 2 according to the embodiment of the FIG. 2 is split immediately before the intermediate image 8.

Figure 3:
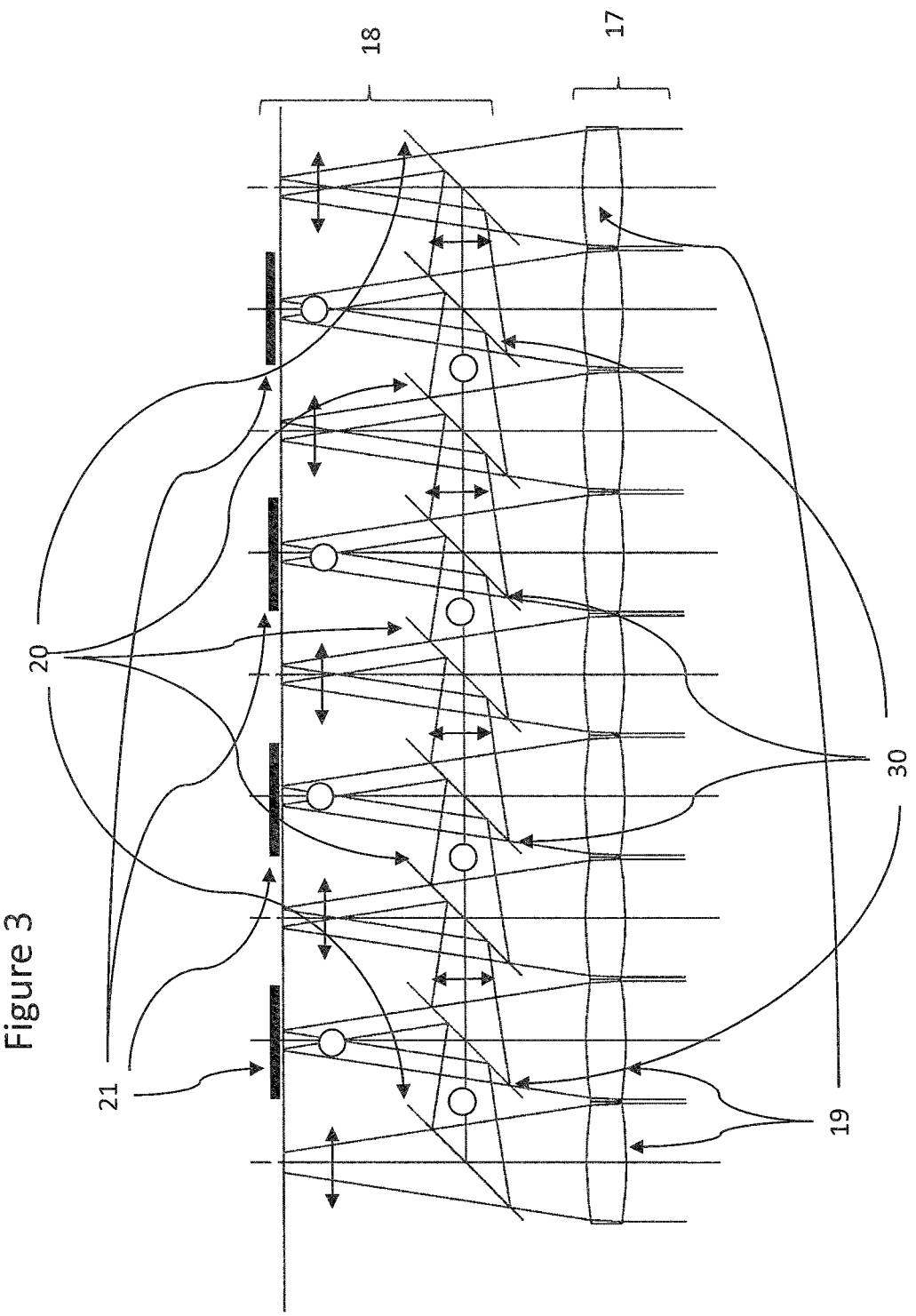
FIG. 3 shows a lens array, an array of polarizing beam splitters with associated means for rotating the polarization direction and reflectors according to the second preferred embodiment of the present invention in a schematic, sectional view.

For this purpose, the light from the imager 2 is split into a plurality of pairs of partial beam paths 6, 7. This can be accomplished with an array 17 of focusing elements 19 (cylindrical lenses) which first decompose the two-dimensional radiation into a plurality of beams (FIG. 3). In addition, the light passes through an array 18 of polarization beam splitters 20, 30, which are arranged next to each other in an alternating pattern (FIG. 3). The polarization beam splitters 20, 30 differ from one another with respect to transmission and reflection of the polarization direction, wherein the respective polarization state of the light after passing the polarizing beam splitters 20, 30 is shown schematically by a circle and a double arrow, respectively. Due to the different effect of the polarization beam splitters 20, 30 on transmission and reflection, the radiation already processed by the polarization beam splitter 20, 30 is deflected again.

The radiation is split by the polarization beam splitters 20, 30 into a plurality of partial beam paths, wherein the polarization direction of adjacent partial beam paths is rotated differently by adjacent polarization beam splitters 20, 30. The polarization direction of each second partial optical beam path of the partial optical beam paths is then rotated by the elements 21 and all beam paths are superimposed to form the intermediate image 8. As can be seen from FIG. 3, a polarization beam splitter 20 and 30, respectively, is associated with each focusing element 19, and a means 21 for rotating the polarization direction is associated with each second focusing element 19. The arrays 17, 18 composed of the elements 19, 20, 30 and 21 are in close proximity to the intermediate image plane 8 (the focal length of the focusing elements 19 is preferably smaller than 5 mm). The elements 19, 20, 30, 21 are preferably distributed uniformly over the intermediate image plane.

Figure 4:
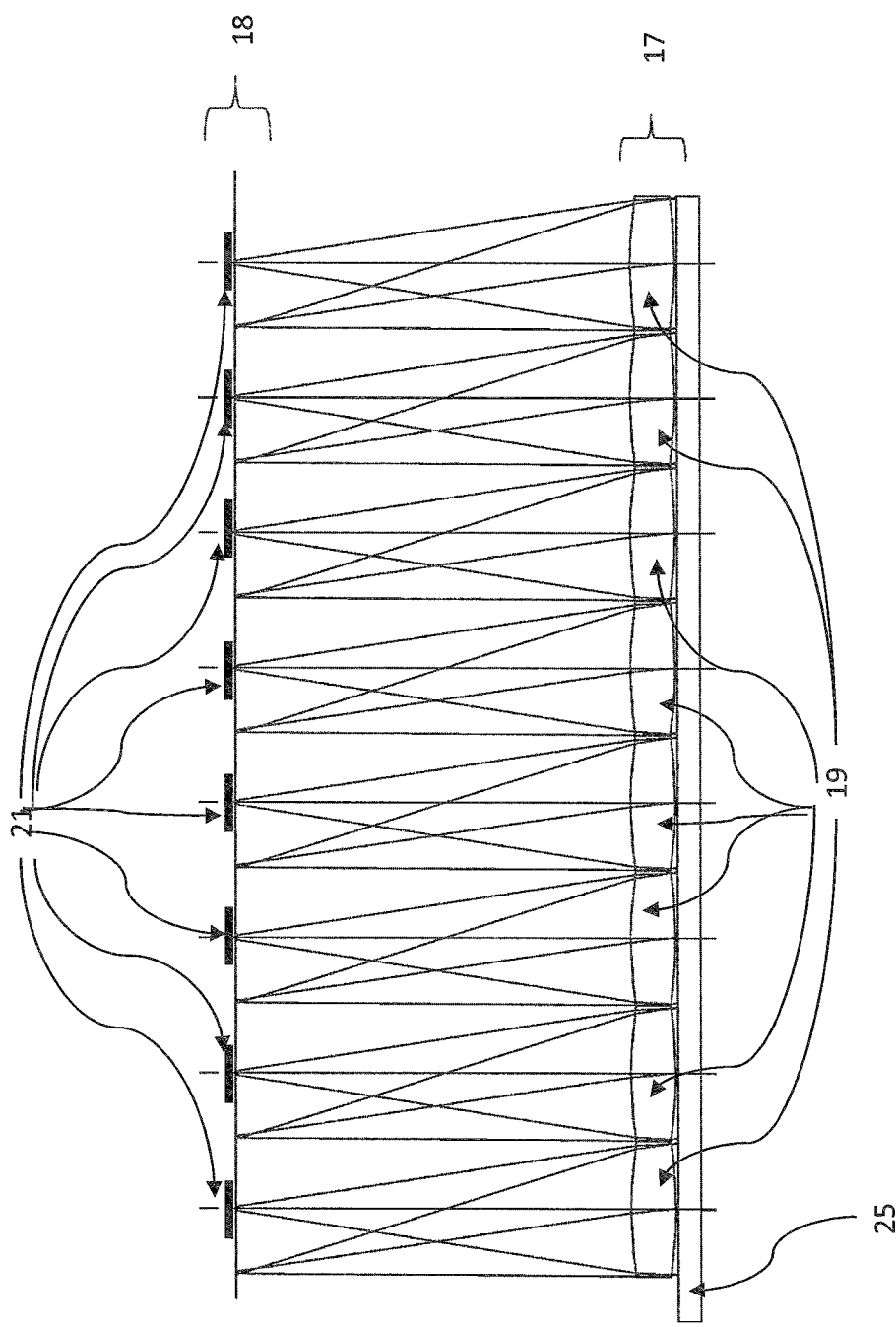
FIG. 4 shows an array of lenses with an upstream element for polarization-dependent beam deflection and a screen with elements for rotating the polarization.

FIG. 4 shows an alternative embodiment for forming the arrays 17 and 18. The array 17 includes a plurality of converging lenses 19 and an upstream birefringent element 25, which extends over the entire array 17. The array 18 includes a plurality of means 21 for rotating the polarization direction, which are spatially arranged such that radiation incident perpendicular onto the lenses 19 (first partial optical path) is focused onto these means 21, whereas radiation incident onto the lenses 19 at a predetermined angle of inclination (second partial beam path) is focused onto regions between adjacent means 21, without rotation of the polarization direction. Alternatively, the polarization direction of the radiation deflected by the birefringent element 25 can also be rotated.

Figure 5:
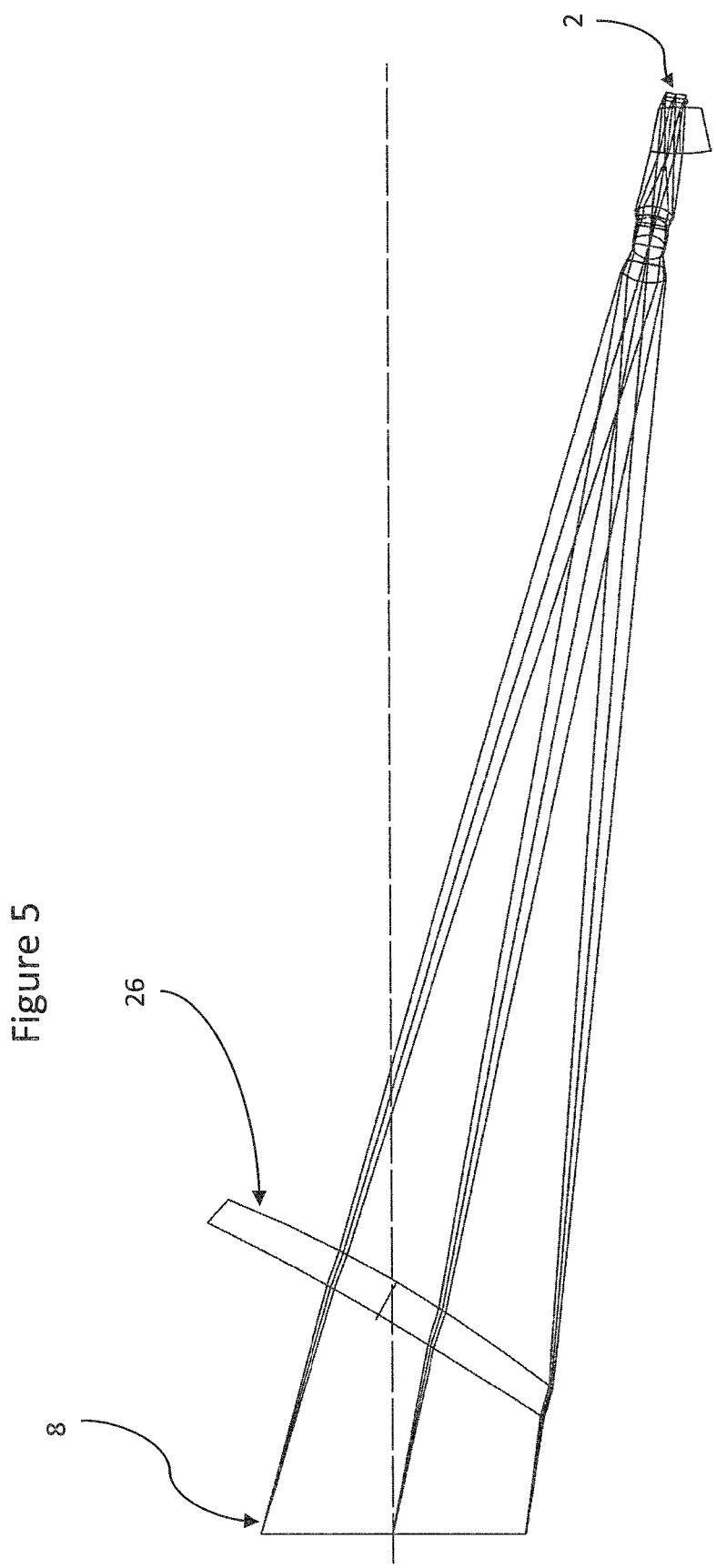
FIGS. 5 to 8 show an optical projection system for a head-up display in a schematic, sectional view according to a third preferred embodiment of the present invention.

FIG. 5 shows imaging optics, which images the image generated by imager 2 on a real projection surface 8. Such unit can be used, for example, in the embodiment of FIG. 1. Such unit is suitable to provide the image information for a HUD. The illuminated image area is inclined to prevent reflections of the sun for the viewer. The field lens 26 positioned in front of the real image in the intermediate image plane 8 is used to adapt the beam of this projection unit to the radiation pattern across the image area required by the actual HUD system. This effect can also be achieved by appropriate patterning (Fresnel lens) of the diffuser sheet. The optical system is designed for a 0.3" chip (DMD from Texas Instruments), and is corrected for a numerical aperture 2.4. The illumination of the DMD chip is not shown.

Figure 6:
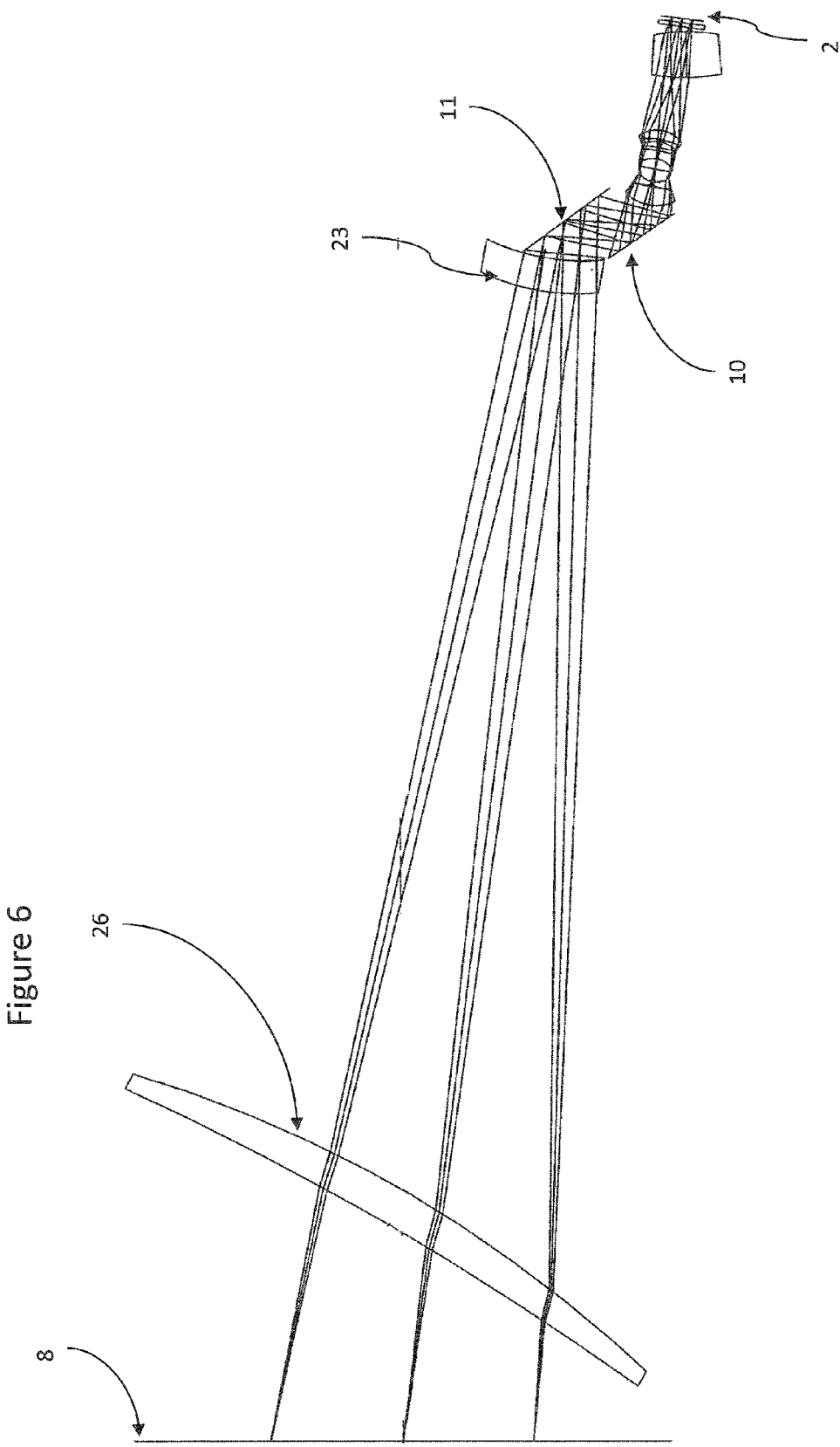

FIG. 6 shows the projection unit of FIG. 5 augmented by the polarization beam splitter 10, a deflection mirror 11 and an additional lens 23 (lens section only required) for coupling out a partial beam path, rotating the polarization and redirecting the beam onto the real intermediate image 8. An additional element for rotating the polarization is not shown. The polarization can be rotated at the mirror 11, on the surfaces of lens, or by inserting an additional element.

Figure 7:
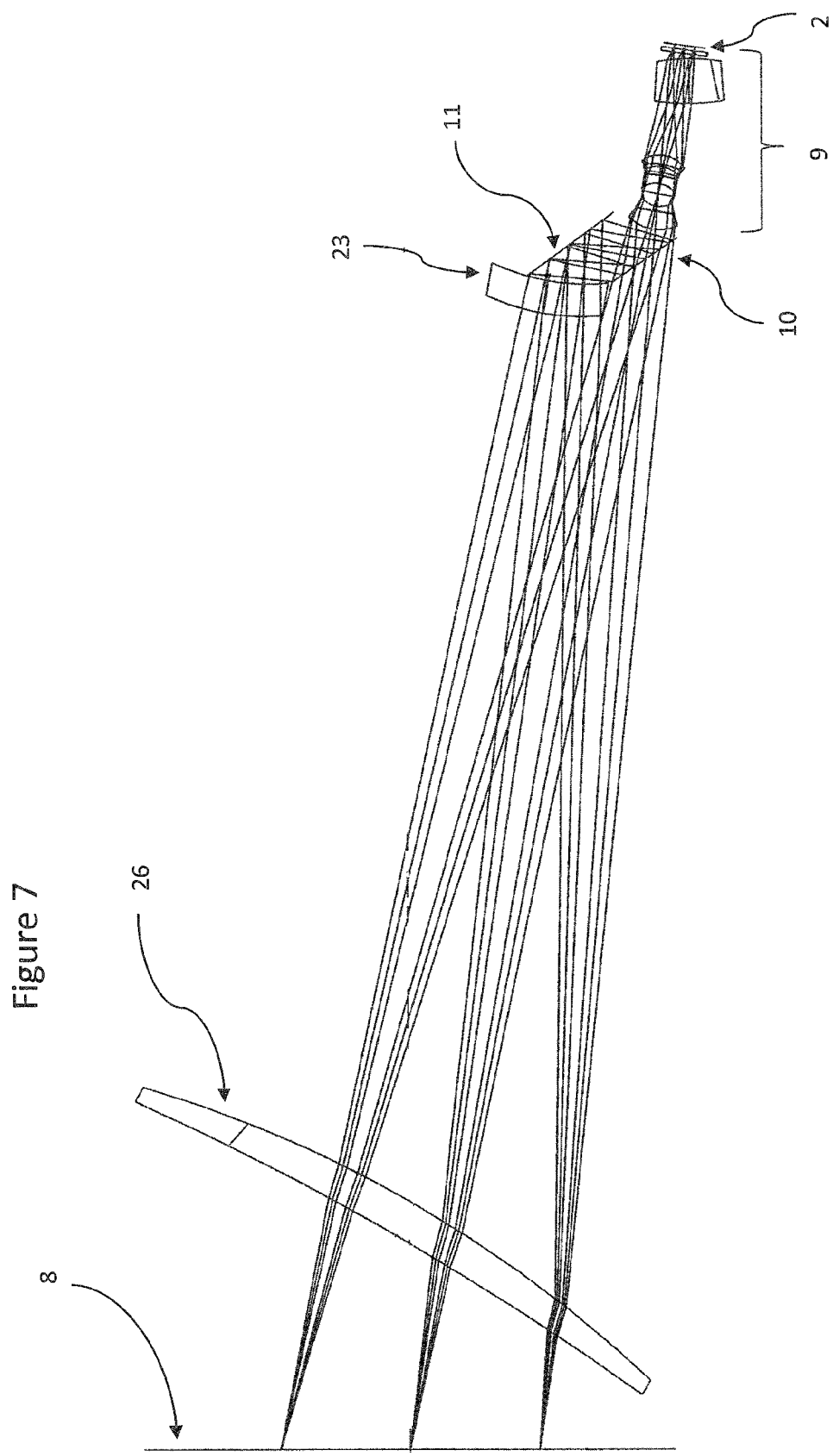

FIG. 7 shows the superposition of the two diagrams of FIGS. 5 and 6.

Figure 8:
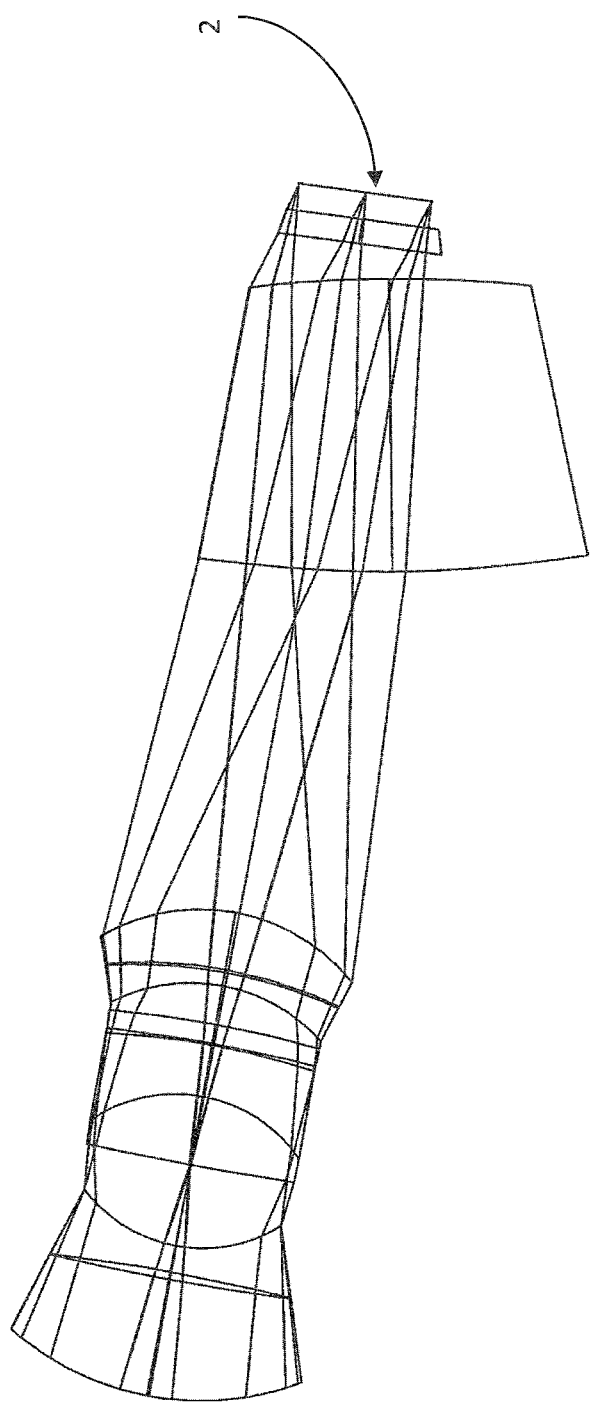

FIG. 8 is an enlarged view of the central projection part of the imaging optics of FIGS. 5 to 7.

The optical data of the lens systems are listed in Table 1 (FIG. 5) and Table 2 (FIGS. 6 and 7).

TABLE 1

| Radii | Thicknesses and Air Gaps | Refractive indices ne | Abbe number ve |
|---|---|---|---|
| Object infinite | t1 | | |
| R1 = −524.567 | d1 = 6.300 | n1 = 1.51976 | v1 = 52.14 |
| R2 = −219.967 | t5 | | |
| R7 = 7.628 | d7 = 3.101 | n4 = 1.81078 | v4 = 40.7 |
| R8 = 65.808 | d8 = 0.208 | | |
| R9 = −48.901 | d9 = 0.695 | n5 = 1.48915 | v5 = 70.0 |
| R10 = 3.943 | d10 = 2.150 | | |
| R11 = 83.440 | d11 = 1.824 | n6 = 1.83945 | v6 = 42.5 |
| R12 = −4.028 | d12 = 1.366 | n7 = 1.73429 | v7 = 28.2 |
| R13 = −21.089 | d13 = 0.044 | | |
| R14 = −42.639 | d14 = 0.506 | n8 = 1.51976 | v8 = 52.1 |
| R15 = −31.102 | d15 = 1.026 | | |
| R16 = −4.704 | d16 = 0.357 | n9 = 1.81264 | v9 = 25.2 |
| R17 = −13.213 | d17 = 0.081 | | |
| R18 = −12.336 | d18 = 1.518 | n10 = 1.83945 | v10 = 42.5 |
| R19 = −5.239 | t6 | | |
| A3 R20 = 29.265 | d20 = 0.770 | n11 = 1.85202 | v11 = 24.6 |
| A4 R21 = −35.116 | t7 | | |
| R22 = infinitely | d22 = 0.650 | n12 = 1.51872 | v11 = 63.96 |
| R23 = infinitely | d23 = 0.709 | | |
| R24 = infinitely | | | |

TABLE 2

| Radii | Thicknesses and Air Gaps | Refractive indices ne | Abbe number ve |
|---|---|---|---|
| Object infinite | t1 | | |
| R1 = −524.567 | d1 = 6.300 | n1 = 1.51976 | v1 = 52.14 |
| R2 = −219.967 | t2 | | |
| A1 R3 = 40.731 | d3 = 5.676 | n2 = 1.52743 | v2 = 56.26 |
| A2 R4 = 40.196 | t3 | Mirror | |
| R5 = 6926.610 | t4 | Mirror | |
| R6 = infinite | t5 | | |
| R7 = 7.628 | d7 = 3.101 | n4 = 1.81078 | v4 = 40.7 |
| R8 = 65.808 | d8 = 0.208 | | |
| R9 = −48.901 | d9 = 0.695 | n5 = 1.48915 | v5 = 70.0 |
| R10 = 3.943 | d10 = 2.150 | | |
| R11 = 83.440 | d11 = 1.824 | n6 = 1.83945 | v6 = 42.5 |
| R12 = −4.028 | d12 = 1.366 | n7 = 1.73429 | v7 = 28.2 |
| R13 = −21.089 | d13 = 0.044 | | |
| R14 = −42.639 | d14 = 0.506 | n8 = 1.51976 | v8 = 52.1 |
| R15 = −31.102 | d15 = 1.026 | | |
| R16 = −4.704 | d16 = 0.357 | n9 = 1.81264 | v9 = 25.2 |
| R17 = −13.213 | d17 = 0.081 | | |
| R18 = −12.336 | d18 = 1.518 | n10 = 1.83945 | v10 = 42.5 |
| R19 = −5.239 | t6 | | |
| A3 R20 = 29.265 | d20 = 0.770 | n11 = 1.85202 | v11 = 24.6 |
| A4 R21 = −35.116 | t7, | | |
| R22 = infinite | d22 = 0.650 | n12 = 1.51872 | v11 = 63.96 |
| R23 = infinite | d23 = 0.709 | | |
| R24 = infinite | | | |

| Aspheres | A1 | A2 | A3 | A4 |
|---|---|---|---|---|
| k = | 6.82469E−01 | 1.43578E+00 | 1.99779E+00 | 2.83240+01 |
| c2 = | 3.38551E−06 | 2.35215E−06 | −1.54043E−04 | 4.97095E−05 |
| c3 = | 3.72430E−09 | 2.38585E−08 | 5.71683E−06 | 1.13441E−06 |
| c4 = | 4.90498E−11 | −1.33755E−12 | −2.96102E−07 | −3.78006E−09 |
| c5 = | −3.21880E−14 | 1.53794E−13 | 7.38780E−09 | 7.26707E−10 |
| c6 = | | | −7.37071E−11 | |

Asphere equation $(h^2/R)/(1 + \text{SQRT}(1 - (1 + k) \cdot (h/r)^2)) + \text{SUM} c(i) \cdot h^{**} 2i \; i = 2, 3, 4, \ldots$ At positions where a displacement and/or a tilt are implemented, a transformation rule according to Table 3 is provided.

TABLE 3

| Transformation | Reference surface | Displacement z | Displacement y | Tilt |
|---|---|---|---|---|
| t1 | Image surface | 26.6019 | 2.273 | −29.898 |
| t2 | 2 | 144.4144 | 56.1366 | 20 |
| t3 | 5 | 6.9341 | −2.6815 | 45.901 |
| t4 | 5 | −0.6485 | −8.466 | −136.028 |
| t5 | 2 | 166.393 | 46.9739 | 19.354 |
| t6 | 19 | 9.5899 | −2.5175 | 10,875 |
| t7, | 21 | 0.9268 | 0.7822 | −8.006 |

This Table includes the reference system for the transformation, the displacement in the z-direction (optical axis or axis of the reference element), the displacement in the plane of the paper perpendicular thereto, and a rotation at the shifted position.

The aspheres A1 to A4 are rotationally symmetric. In the formula, the calculation of the rise is specified as a function of the height h of an arbitrary point.

LIST OF REFERENCE SYMBOLS 2 display unit
3 display area
4 viewer
5 imaging optics
6 first partial beam path
7 second partial beam path
8 intermediate image plane/intermediate image
9 focusing unit
10 polarization beam splitter
11 reflector/reflective surface of the polarization beam splitter
13 concave reflector
14 transparent surface
15 focusing plane
16 beam-shaping element
17 lens array
18 array of polarization beam splitters, array of means for rotating the polarization direction
19 focusing element
20 polarization beam splitter
21 means for rotating the polarization direction
23 lens
24 eyebox
25 birefringent element
26 field lens
30 polarization beam splitter

What is claimed is:

1. An optical projection system for a display, comprising:
an imaging display unit, which emits uniaxial image information at least partially in the form of unpolarized light,
imaging optics configured to generate a virtual image of the image information generated by the display unit in a display area,
wherein the imaging optics are further configured to split the light emitted by the display unit into at least two partial beam paths each having a different polarization, to rotate the polarization direction of at least one of the two partial beam paths, to subsequently superimpose the two partial beam paths, and to display the two superimposed partial beam paths as a virtual image in the display area,
wherein the imaging optics comprise an array having a plurality of focusing elements arranged in a matrix pattern, and a plurality of polarization beam splitters, wherein each polarization beam splitter of the plurality of polarization beam splitters is associated with each focusing element of the plurality of focusing elements in a one-to-one fashion, each polarization beam splitter of the plurality of polarization beam splitters provided between the plurality of focusing elements and the display area and all polarization beam splitters of the plurality of polarization beam splitters directly arranged next to each other in an alternating pattern with respect to transmission and reflection of the polarization direction,
wherein at least one of each pair of two adjacent polarization beam splitters acts as a reflector for beam deflection to the other one, and
wherein a polarization rotator for rotating the polarization direction is associated with only one of each pair of two adjacent polarization beam splitters of the plurality of polarization beam splitters.

2. The optical projection system of claim 1, wherein the imaging optics are configured to superimpose the two partial beam paths to a real intermediate image and to display a virtual image of the intermediate image in the display area.

3. The optical projection system of claim 1, wherein the imaging optics for producing a virtual image comprises at least one concave reflector for producing the virtual image.

4. The optical projection system of claim 3, wherein a second focusing unit is provided between the polarization beam splitters and the concave reflector.

5. The optical projection system of claim 1, wherein a first focusing unit is provided between the display unit and the polarization beam splitters.

6. A head-up display with a transparent surface which operates as a display area in a viewing direction of a viewer, and the head-up display comprising:
an optical projection system, the optical projection system comprising:
an imaging display unit, which emits uniaxial image information at least partially in the form of unpolarized light,
imaging optics is configured to generate a virtual image of the image information generated by the display unit in a display area,
wherein the imaging optics are further configured to split the light emitted by the display unit into at least two partial beam paths each having a different polarization, to rotate the polarization direction of at least one of the two partial beam paths, to subsequently superimpose the two partial beam paths, and to display the two superimposed partial beam paths as a virtual image in the display area,
wherein the imaging optics comprise an array having a plurality of focusing elements arranged in a matrix pattern, and a plurality of polarization beam splitters, wherein each polarization beam splitter of the plurality of polarization beam splitters is associated with each focusing element of the plurality of focusing elements in a one-to-one fashion, each polarization beam splitter of the plurality of polarization beam splitters is provided between the plurality of focusing elements and the display area and all polarization beam splitters of the plurality of polarization beam splitters are directly arranged next to each other in an alternating pattern with respect to transmission and reflection of the polarization direction, wherein at least one of each pair of two adjacent polarization beam splitters acts as a reflector for beam deflection to the other one, and wherein a polarization rotator for rotating the polarization direction is associated with only one of each pair of two adjacent polarization beam splitters of the plurality of polarization beam splitters.

7. The head-up display of claim 6, wherein the imaging optics is configured to rotate the polarization direction of at least one of the two partial beam paths such that the light emitted by the display unit has a polarization parallel to the transparent surface.

8. An optical projection system for a display, comprising:

an imaging display unit which emits uniaxial image information at least partially in form of unpolarized light; and imaging optics which is configured to generate a virtual image of image information generated by the imaging display unit in a display area, wherein the imaging optics is further configured to split the light emitted by the imaging display unit into at least two partial beam paths having each a different polarization, to rotate the polarization direction of at least one of the at least two partial beam paths, to subsequently superimpose the at least two partial beam paths, and to display the at least two superimposed partial beam paths as a virtual image in the display area, wherein the imaging optics comprises an array having a plurality of focusing elements arranged in a matrix pattern and an upstream birefringent element which extends over the entire array, the birefringent element provided between the imaging display unit and the plurality of focusing elements, and wherein each polarization rotator of a plurality of polarization rotators for rotating the polarization direction is associated with each focusing element of the plurality of focusing elements in a one-to-one fashion, wherein the plurality of polarization rotators is provided between the plurality of focusing elements and the display area.

9. The optical projection system of claim 8, wherein the imaging optics are configured to superimpose the two partial beam paths to a real intermediate image and to display a virtual image of the intermediate image in the display area.

10. The optical projection system of claim 8, wherein the imaging optics for producing a virtual image comprises at least one concave reflector for producing the virtual image.

11. The optical projection system of claim 10, wherein a second focusing unit is provided between the birefringent element and the concave reflector.

12. The optical projection system of claim 8, wherein a first focusing unit is provided between the display unit and the birefringent element.

13. A head-up display with a transparent surface which operates as a display area in a viewing direction of a viewer, and an optical projection system, the optical projection system comprising:

an imaging display unit, which emits uniaxial image information at least partially in form of unpolarized light; and imaging optics which is configured to generate a virtual image of image information generated by the imaging display unit in a display area, wherein the imaging optics is further configured to split the light emitted by the imaging display unit into at least two partial beam paths having each a different polarization, to rotate the polarization direction of at least one of the at least two partial beam paths, to subsequently superimpose the at least two partial beam paths, and to display the two at least superimposed partial beam paths as a virtual image in the display area, wherein the imaging optics comprises an array having a plurality of focusing elements arranged in a matrix pattern and an upstream birefringent element which extends over the entire array, the birefringent element provided between the display unit and the plurality of focusing elements, and wherein the polarization rotator of a plurality of polarization rotators for rotating the polarization direction is associated with each focusing element of the plurality of focusing elements in a one-to-one fashion, wherein the plurality of polarization rotators is provided between the plurality of focusing elements and the display area.

14. The head-up display of claim 13, wherein the imaging optics is configured to rotate the polarization direction of at least one of the two partial beam paths such that the light emitted by the display unit has a polarization parallel to the transparent surface.

* * * * *